US012688956B2

(12) United States Patent
Jinno et al.

(10) Patent No.: US 12,688,956 B2
(45) Date of Patent: Jul. 21, 2026

(54) VACUUM VALVE AND METHOD FOR MANUFACTURING SAME

(71) Applicant: Mitsubishi Electric Corporation, Tokyo (JP)

(72) Inventors: Katsuya Jinno, Tokyo (JP); Tatsuya Koyama, Tokyo (JP); Taiki Donen, Tokyo (JP); Yasutomo Otake, Tokyo (JP); Naoya Aihara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 458 days.

(21) Appl. No.: 18/275,229

(22) PCT Filed: Mar. 31, 2021

(86) PCT No.: PCT/JP2021/013814

§ 371 (c)(1),
(2) Date: Aug. 1, 2023

(87) PCT Pub. No.: WO2022/208716

PCT Pub. Date: Oct. 6, 2022

(65) Prior Publication Data

US 2024/0105364 A1 Mar. 28, 2024

(51) Int. Cl.
*H01C 1/026* (2006.01)
*H01C 1/14* (2006.01)
*H01C 17/00* (2006.01)

(52) U.S. Cl.
CPC ............... *H01C 1/026* (2013.01); *H01C 1/14* (2013.01); *H01C 17/00* (2013.01)

(58) Field of Classification Search
CPC ........... H01C 1/026; H01C 1/14; H01C 17/00
See application file for complete search history.

(56) References Cited

U.S. PATENT DOCUMENTS 10,102,989 B2 * 10/2018 Hartmann ............ H01H 33/662
2014/0125449 A1 5/2014 Takenaka et al.
(Continued)

FOREIGN PATENT DOCUMENTS

JP S60-075940 U 5/1985
JP 2009-277386 A 11/2009
(Continued)

OTHER PUBLICATIONS

JP-2011071433 machine translation. (Year: 2011).*
(Continued)

*Primary Examiner* — Kyung S Lee
(74) *Attorney, Agent, or Firm* — XSENSUS LLP

(57) ABSTRACT

A vacuum valve includes a structure having: a container in which a fixed-side end plate and a movable-side end plate are fixed to both ends of an insulation cylinder; and an arc shield at an intermediate portion of the insulation cylinder. The vacuum valve includes: a voltage nonlinear resistance layer containing particles having a voltage nonlinear resistance characteristic at at least either one of an outer creepage surface or an inner creepage surface of the insulation cylinder. A filling rate of the particles in the voltage nonlinear resistance layer has a distribution along a film thickness direction, and a filling rate of the particles in an outermost layer is not greater than half of an average filling rate of the particles in an entirety of the voltage nonlinear resistance layer.

14 Claims, 5 Drawing Sheets

(56) References Cited

U.S. PATENT DOCUMENTS

| | | | | |
|---|---|---|---|---|
| 2021/0327666 | A1* | 10/2021 | Benkert | H01H 33/66261 |
| 2023/0260725 | A1* | 8/2023 | Aihara | H01H 33/662<br>218/136 |

FOREIGN PATENT DOCUMENTS

| | | | |
|---|---|---|---|
| JP | 2011071433 | * | 4/2011 |
| JP | 2013-219091 | A | 10/2013 |
| JP | 2015-101714 | A | 6/2015 |
| JP | 2022131901 | * | 9/2022 |

OTHER PUBLICATIONS

JP-2022131901 machine translation. (Year: 2022).*

International Search Report and Written Opinion mailed on Jun. 8, 2021, received for PCT Application PCT/JP2021/013814, filed on Mar. 31, 2021, 8 pages including English Translation.

* cited by examiner

VACUUM VALVE AND METHOD FOR MANUFACTURING SAME

CROSS-REFERENCE TO RELATED APPLICATION

The present application is based on PCT filing PCT/JP2021/013814, filed Mar. 31, 2021, the entire contents of which are incorporated herein by reference.

TECHNICAL FIELD

The present disclosure relates to a vacuum valve having an electric field relaxation structure and a method for manufacturing the same.

BACKGROUND ART

A vacuum valve is a device that causes current to flow or blocks current by bringing electrodes into contact with each other or opening the electrodes in a vacuum atmosphere. In an insulation design of a vacuum valve, an electric field is one of the important items to be considered, and is designed such that the electric field with respect to applied voltage is less than an allowable value. In a structure in which the electric field is low enough when compared with the allowable value, the insulation distance can be further reduced, which enables advancement of downsizing. Thus, relaxing the electric field can serve as means for downsizing. As a method for electric field relaxation, a method in which a voltage nonlinear resistance material is applied on an insulation cylinder of a vacuum valve is known. For example, Patent Document 1 shows a technology for relaxing the electric field in the inside of a vacuum valve, by attaching a layer composed of a voltage nonlinear resistance material and a resin to an outer creepage surface of an insulation cylinder of a vacuum valve. Patent Document 2 shows a material composition of a voltage nonlinear resistance material obtained by blending a filler having a voltage nonlinear resistance characteristic, a resin, and semiconductive whiskers. Further, Patent Document 3 includes a description regarding a cured material structure in which, in a cured material obtained by mixing a resin and a filler having a voltage nonlinear resistance characteristic, a voltage nonlinear resistance material is caused to partially protrude.

CITATION LIST

Patent Document

Patent Document 1: Japanese Laid-Open Utility Model Publication No. 60-75940

Patent Document 2: Japanese Laid-Open Patent Publication No. 2015-101714

Patent Document 3: Japanese Laid-Open Patent Publication No. 2013-219091

SUMMARY OF THE INVENTION

Problem to be Solved by the Invention

However, in the configurations as in Patent Documents 1, 2, 3, when current flows in the voltage nonlinear resistance material and the temperature rapidly increases, adhesion of an interface may decrease due to a difference in the coefficient of thermal expansion between the voltage nonlinear resistance particles and the resin. Therefore, there has been a problem that when the vacuum valve operates and vibration is caused, the voltage nonlinear resistance particles fall off, resulting in a foreign matter inside the device. That is, with only a single layer composed of voltage nonlinear resistance particles and a resin, there is a risk of causing decrease in reliability of an apparatus.

The present disclosure has been made in order to solve the above problem. An object of the present disclosure is to provide a vacuum valve that relaxes the electric field of the vacuum valve without impairing reliability and a method for manufacturing the same.

Means to Solve the Problem

A vacuum valve according to the present disclosure includes a structure having: a container in which a fixed-side end plate and a movable-side end plate are fixed to both ends of an insulation cylinder; and an arc shield at an intermediate portion of the insulation cylinder. The vacuum valve includes: a voltage nonlinear resistance layer containing particles having a voltage nonlinear resistance characteristic at at least either one of an outer creepage surface or an inner creepage surface of the insulation cylinder. A filling rate of the particles in the voltage nonlinear resistance layer has a distribution along a film thickness direction. A filling rate of the particles in an outermost layer is not greater than half of an average filling rate of the particles in an entirety of the voltage nonlinear resistance layer.

A method for manufacturing a vacuum valve according to the present disclosure is for manufacturing a vacuum valve including a structure having: a container in which a fixed-side end plate and a movable-side end plate are fixed to both ends of an insulation cylinder; and an arc shield at an intermediate portion of the insulation cylinder. The method includes: applying a material, in a liquid state, containing particles having a voltage nonlinear resistance characteristic at at least either one of an outer creepage surface or an inner creepage surface of the insulation cylinder, and curing the material, to form a voltage nonlinear resistance layer, such that a filling rate of the particles in the voltage nonlinear resistance layer has a distribution along a film thickness direction, and a filling rate of the particles in an outermost layer is not greater than half of an average filling rate of the particles in an entirety of the voltage nonlinear resistance layer.

Effect of the Invention

According to the vacuum valve and the method for manufacturing the same of the present disclosure, falling-off of the voltage nonlinear resistance particles can be suppressed. Thus, it is possible to apply a structure for relaxing the electric field of the vacuum valve in a state of high reliability, without impairing reliability of an apparatus. Further, since the electric field can be relaxed, the vacuum valve that is downsized when compared with a conventional one can be obtained.

DESCRIPTION OF EMBODIMENTS

Figure 1:
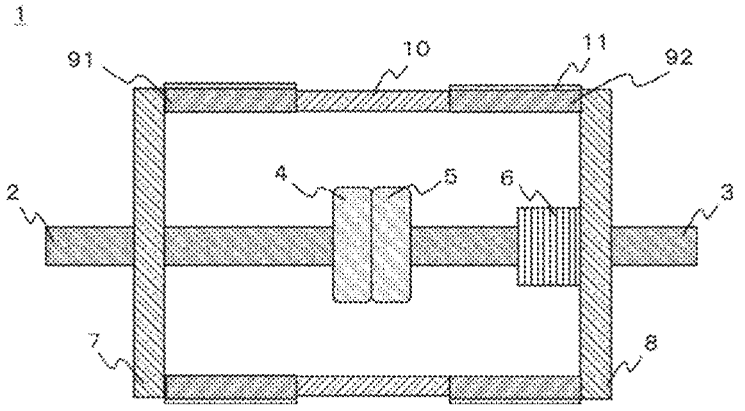
FIG. 1 is a schematic configuration diagram showing a state where contacts of a vacuum valve according to embodiment 1 of the present disclosure are closed.

Hereinafter, a general embodiment of the present disclosure will be described with reference to the drawings. In the drawings, identical and corresponding portions are denoted by the same reference characters.

Embodiment 1

FIG. 1 is a schematic configuration diagram showing a state where contacts of a vacuum valve according to embodiment 1 of the present disclosure are closed. FIG. 1 shows a cross section of the vacuum valve 1 having a cylindrical shape. As shown in FIG. 1, the vacuum valve 1 is provided with a fixed-side electrode rod 2, a movable-side electrode rod 3, a fixed-side contact 4, a movable-side contact 5, a bellows 6, a fixed-side end plate 7, a movable-side end plate 8, an insulation cylinder A 91, an insulation cylinder B 92, and an arc shield 10. In addition, a voltage nonlinear resistance layer 11 is provided at the outer creepage surface of each of the insulation cylinder A 91 and the insulation cylinder B 92.

The fixed-side end plate 7 is provided at one end of the insulation cylinder A 91, and the movable-side end plate 8 is fixed to the other end of the insulation cylinder B 92. The arc shield 10 is provided in an insulation cylinder intermediate portion between the insulation cylinder A 91 and the insulation cylinder B 92, and these form the container of the vacuum valve 1.

Figure 2:
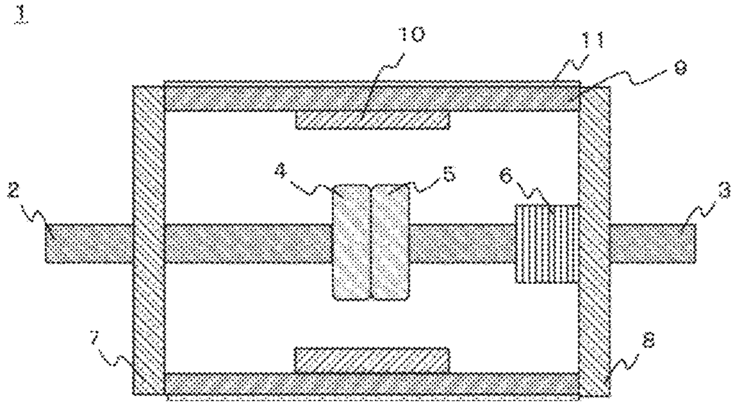
FIG. 2 is a schematic configuration diagram showing a state where contacts of a vacuum valve according to embodiment 1 of the present disclosure are closed.

FIG. 2 is a schematic configuration diagram showing a state where contacts of a vacuum valve according to embodiment 1 of the present disclosure are closed. In FIG. 1, an example in which the insulation cylinder A 91, the arc shield 10, and the insulation cylinder B 92 are sequentially disposed along the movable direction of the movable-side electrode rod 3 to form the outer creepage surface of the vacuum valve, is shown. However, as shown in FIG. 2, a structure in which the insulation cylinder A 91 and the insulation cylinder B 92 are integrated together to serve as an insulation cylinder 9 may be adopted. In this case, the arc shield 10 is disposed inside the insulation cylinder 9. In the following description and drawings, when a configuration applicable to all of the insulation cylinder A 91, the insulation cylinder B 92, and the insulation cylinder 9 is shown, these will be collectively referred to as the insulation cylinder 9.

Figure 3:
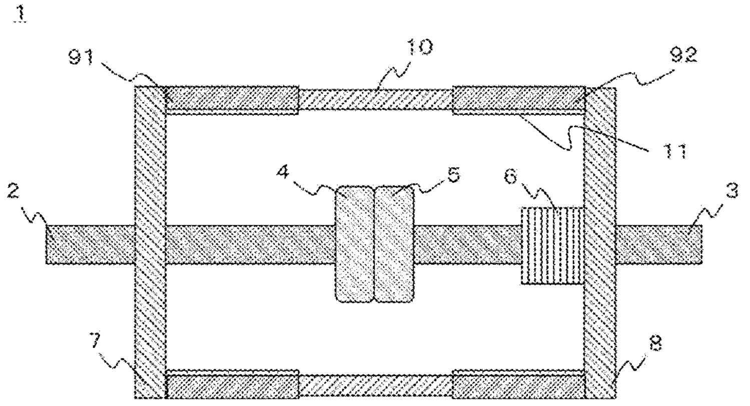
FIG. 3 is a schematic configuration diagram showing a state where contacts of a vacuum valve according to embodiment 1 of the present disclosure are closed.

FIG. 3 is a schematic configuration diagram showing a state where contacts of a vacuum valve according to embodiment 1 of the present disclosure are closed. In FIG. 1, an example in which the voltage nonlinear resistance layer 11 is provided at the outer creepage surface of each of the insulation cylinder A 91 and the insulation cylinder B 92 is shown. However, as shown in FIG. 3, the voltage nonlinear resistance layer 11 may be provided at the inner creepage surface of each of the insulation cylinder A 91 and the insulation cylinder B 92. Alternatively, the voltage nonlinear resistance layer 11 may be provided at both of the outer creepage surface and the inner creepage surface.

Figure 4:
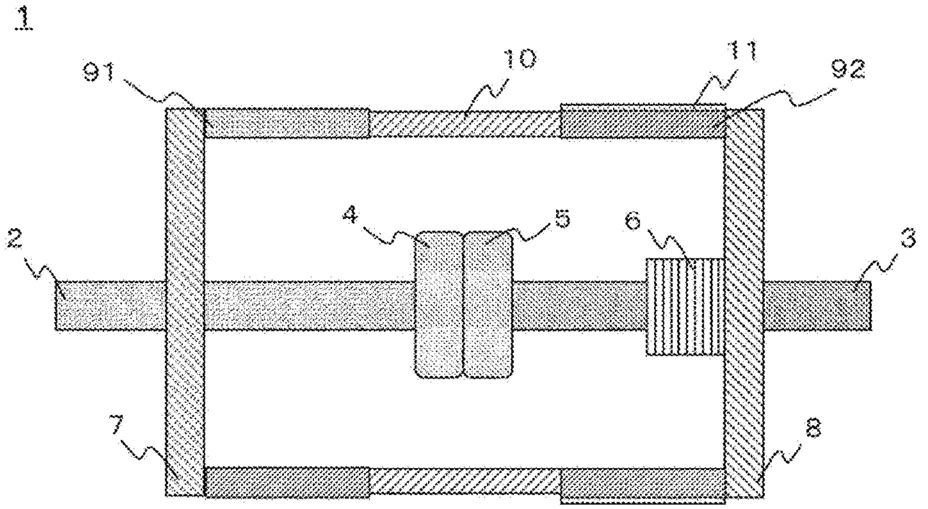
FIG. 4 is a schematic configuration diagram showing a state where contacts of a vacuum valve according to embodiment 1 of the present disclosure are closed.

FIG. 4 is a schematic configuration diagram showing a state where contacts of a vacuum valve according to embodiment 1 of the present disclosure are closed. The voltage nonlinear resistance layer 11 need not be provided at the entire surface of the outer creepage surface and inner creepage surface of the insulation cylinder B 92, and may be provided only at the outer creepage surface of the insulation cylinder B 92 on the movable-side end plate 8 side.

Figure 5:
FIG. 5 is a schematic configuration diagram showing a voltage nonlinear resistance layer at an insulation cylinder surface of a vacuum valve according to embodiment 1 of the present disclosure.

FIG. 5 is a schematic configuration diagram showing a voltage nonlinear resistance layer at an insulation cylinder surface of a vacuum valve according to embodiment 1 of the present disclosure. FIG. 5 is a diagram when an insulation cylinder B 92 surface is viewed from above and is a representative diagram in which the voltage nonlinear resistance layer 11 is provided in a stripe pattern. As shown in FIG. 5, the voltage nonlinear resistance layer 11 need not be provided at the entire surface of the insulation cylinder B 92 surface, and may be provided, in a narrower range, so as to be in a stripe pattern with respect to the outer creepage surface of the insulation cylinder B 92 on the movable-side end plate 8 side. Here, an insulation cylinder 9 surface means both or either one of the outer creepage surface and the inner creepage surface of the insulation cylinder 9.

Figure 6:
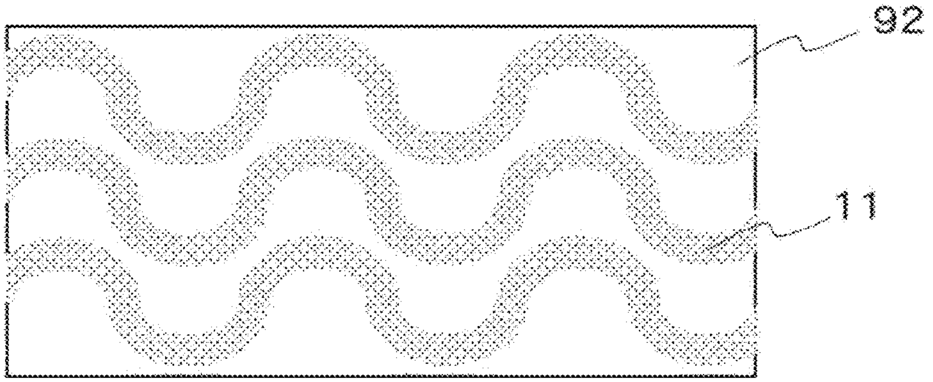
FIG. 6 is a schematic configuration diagram showing a voltage nonlinear resistance layer at an insulation cylinder surface of a vacuum valve according to embodiment 1 of the present disclosure.

FIG. 6 is a schematic configuration diagram showing a voltage nonlinear resistance layer at an insulation cylinder surface of a vacuum valve according to embodiment 1 of the present disclosure. As shown in FIG. 6, the voltage nonlinear resistance layer 11 may be provided so as to be in a waved stripe pattern at the insulation cylinder B 92 surface. When the voltage nonlinear resistance layer 11 is in a waved shape, the distance by which the voltage nonlinear resistance layer 11 is provided can be increased, and thus, the current-conduction distance can be increased. Further, this also applies to the insulation cylinder A 91 on the fixed-side end plate 7 side, instead of the insulation cylinder B 92 side of the movable-side end plate 8. The structures shown in FIG. 5 and FIG. 6 also apply to the case of the insulation cylinder 9. The range in which the voltage nonlinear resistance layer 11 is provided is according to a design idea such as the size or the heat generation amount of an apparatus, and can be freely determined by the designer.

The greater the thickness of the voltage nonlinear resistance layer 11 is, the more heat can be dissipated, and thus, temperature increase can be reduced. However, in order to cause current conduction, the voltage nonlinear resistance layer 11 needs to be provided such that the arc shield 10 and at least either one of the fixed-side end plate 7 or the movable-side end plate 8, or the fixed-side end plate 7 and the movable-side end plate 8 are electrically connected.

Next, a configuration of the vacuum valve 1 including the voltage nonlinear resistance layer 11 will be described. The fixed-side electrode rod 2 and the fixed-side contact 4 are integrated with each other by brazing, and the movable-side electrode rod 3 and the movable-side contact 5 are integrated with each other by brazing, for example. The fixed-side electrode rod 2 penetrates the fixed-side end plate 7, and is mounted by brazing, for example. Similarly, the movable-side electrode rod 3 penetrates the movable-side end plate 8, and is mounted by brazing, for example. The fixed-side end plate 7 and the insulation cylinder A 91 are mounted by brazing, and the movable-side end plate 8 and the insulation cylinder B 92 are mounted by brazing, for example. The insulation cylinder A 91, the insulation cylinder B 92, and the arc shield 10 are mounted by brazing, for example.

Here, as shown in FIG. 2, the arc shield 10 may be disposed inside the vacuum valve 1. In this case, the brazing step can be simplified.

When the voltage nonlinear resistance layer 11 is provided at the outer creepage surface of the insulation cylinder A 91, the insulation cylinder B 92, or the insulation cylinder 9, the voltage nonlinear resistance layer 11 can be formed afterwards, after all of the brazing steps have been completed. Meanwhile, when the voltage nonlinear resistance layer 11 is provided at the inner creepage surface, the voltage nonlinear resistance layer 11 can be formed in a step before the brazing steps are completed, e.g., before the fixed-side end plate 7 and the insulation cylinder A 91 are brazed, and the movable-side end plate 8 and the insulation cylinder B 92 are brazed.

The material forming the voltage nonlinear resistance layer 11 is a composite material composed of a matrix material 13 and voltage nonlinear resistance particles 12 having a voltage nonlinear resistance characteristic. The voltage nonlinear resistance layer 11 includes a portion that becomes an insulator at a threshold electric field or lower, and that becomes a conductor at the threshold electric field or higher.

Figure 7:
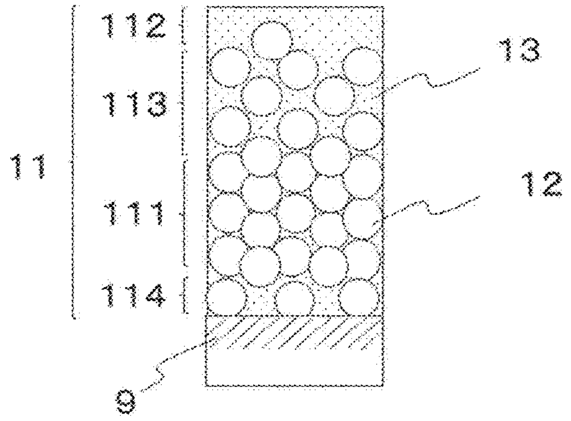
FIG. 7 is a schematic configuration diagram showing a voltage nonlinear resistance layer of a vacuum valve according to embodiment 1 of the present disclosure.

FIG. 7 is a schematic configuration diagram showing a voltage nonlinear resistance layer of a vacuum valve according to embodiment 1 of the present disclosure. As shown in FIG. 7, the voltage nonlinear resistance layer 11 according to the present disclosure has a configuration that has, when the layer in contact with the insulation cylinder 9 surface is assumed to be the innermost layer, a distribution in which the filling rate of the voltage nonlinear resistance particles 12 is different along the film thickness direction. The voltage nonlinear resistance layer 11 includes, for example: a portion 111 having a voltage nonlinear resistance characteristic, and in addition, a particle-falling-off suppression portion 112 corresponding to the outermost layer, a stress relaxation portion A 113 for relaxing a stress generated due to a difference in the coefficient of thermal expansion caused by the difference in the filling rate between the portion 111 having the voltage nonlinear resistance characteristic and the particle-falling-off suppression portion 112, and a stress relaxation portion B 114 for relaxing a stress generated due to a difference in the coefficient of thermal expansion between the insulation cylinder 9 and the portion 111 having the voltage nonlinear resistance characteristic. In FIG. 7, for example, the innermost layer in contact with the insulation cylinder 9 surface of the voltage nonlinear resistance layer 11 is assumed to be the stress relaxation portion B 114, then, the portion 111 having the voltage nonlinear resistance characteristic, the stress relaxation portion A 113, and the particle-falling-off suppression portion 112 are sequentially formed along the film thickness direction.

It is preferable that the portion 111 having the voltage nonlinear resistance characteristic has a larger filling rate since the voltage nonlinear resistance particles 12 need to adhere to each other. However, when the filling rate is too large, the matrix material 13 becomes insufficient, which causes voids. Therefore, the filling rate of the voltage nonlinear resistance particles 12 of the portion 111 having the voltage nonlinear resistance characteristic is desirably not less than 25 vol % and not greater than 74 vol %. Desirably, the filling rate of the voltage nonlinear resistance particles 12 of the particle-falling-off suppression portion 112 is not greater than half, and preferably not greater than 10 vol %, of the average particle filling rate of the voltage nonlinear resistance layer 11.

The average particle filling rate (the filling rate of the particles in the entirety of the voltage nonlinear resistance layer) is obtained from the proportion of the volume of the voltage nonlinear resistance particles 12 contained in the voltage nonlinear resistance layer 11 relative to the volume of the voltage nonlinear resistance layer 11. The average particle filling rate can be measured by the method below, for example. The voltage nonlinear resistance layer 11 is peeled off from the member on which the voltage nonlinear resistance layer 11 has been applied, and the weight is measured. This weight is the total weight of the voltage nonlinear resistance particles 12 and the matrix material 13, and this weight is defined as A. Next, the matrix material 13 is burned off from the peeled-off voltage nonlinear resistance layer 11. For example, when the matrix material 13 is an epoxy resin, the matrix material 13 can be burned off at 300° C. The weight after the burning-off is the weight of the voltage nonlinear resistance particles 12 only, and this weight is defined as B. From the measurement values of the weights of A and B, and the values of the densities of the voltage nonlinear resistance particles 12 and the matrix material 13, the average particle filling rate can be measured.

The thickness of the particle-falling-off suppression portion 112 can be made larger when the magnitude of the average particle diameter of the voltage nonlinear resistance particles 12 is larger, can be made smaller when the magnitude of the average particle diameter of the voltage nonlinear resistance particles 12 is smaller, and only needs to have the thickness corresponding to the average particle diameter of the voltage nonlinear resistance particles 12. The particle-falling-off suppression portion 112 corresponds to a range inward by the magnitude of the average particle diameter from the outermost side of the voltage nonlinear resistance layer 11. The stress relaxation portion A 113 and the stress relaxation portion B 114 are portions having different filling rates, and can be provided as appropriate in order to relax the stress between the insulation cylinder 9 and the portion 111 having the voltage nonlinear resistance characteristic, and between the portion 111 having the voltage nonlinear resistance characteristic and the particle-falling-off suppression portion 112.

Here, the stress is generated due to a difference in the coefficient of thermal expansion when current flows in the portion 111 having the voltage nonlinear resistance characteristic and temperature increase is caused. At the interface between the portion 111 having the voltage nonlinear resistance characteristic and the particle-falling-off suppression portion 112, the filling rate of the voltage nonlinear resistance particles 12 is sharply changed, and thus, a configuration having a stress relaxation portion may be appropriate in some cases. A configuration that has a layer having a filling rate between those in the portion 111 having the voltage nonlinear resistance characteristic and the particle-falling-off suppression portion 112 is desirable.

Figure 8:
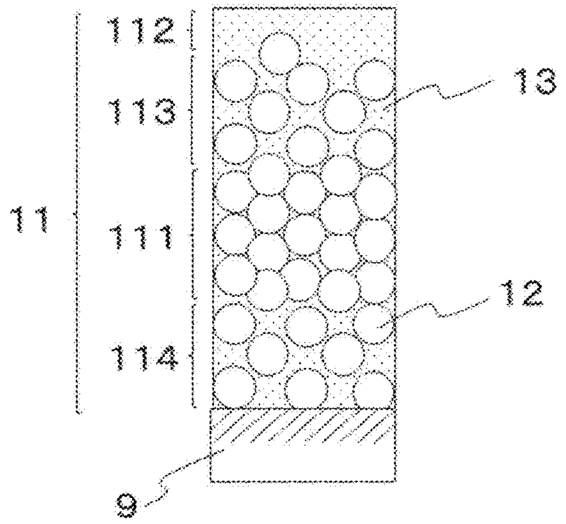
FIG. 8 is a schematic configuration diagram showing a voltage nonlinear resistance layer of a vacuum valve according to embodiment 1 of the present disclosure.

FIG. 8 is a schematic configuration diagram showing a voltage nonlinear resistance layer of a vacuum valve according to embodiment 1 of the present disclosure. For a portion having a large stress, the thickness of the stress relaxation portion B 114 may be increased as shown in FIG. 8.

Figure 9:
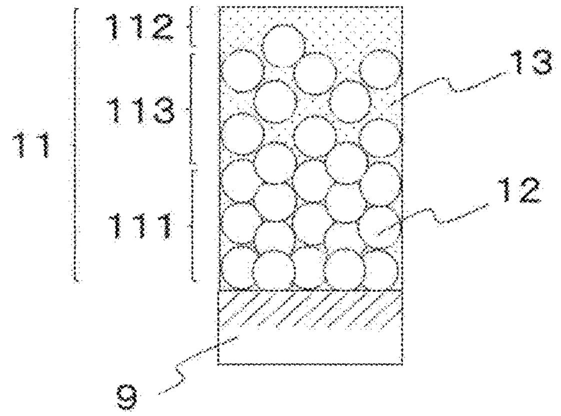
FIG. 9 is a schematic configuration diagram showing a voltage nonlinear resistance layer of a vacuum valve according to embodiment 1 of the present disclosure.

FIG. 9 is a schematic configuration diagram showing a voltage nonlinear resistance layer of a vacuum valve according to embodiment 1 of the present disclosure. When influence of temperature change or vibration is small and stress relaxation is unnecessary, a structure in which the stress relaxation portion B 114 is not provided in the innermost layer in contact with the insulation cylinder 9 surface as shown in FIG. 9 may be adopted.

Figure 10:
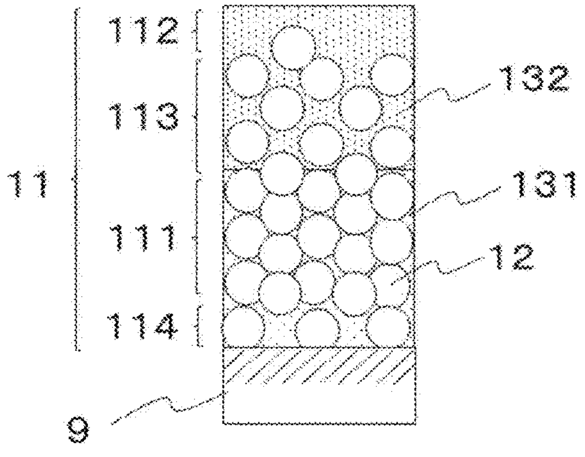
FIG. 10 is a schematic configuration diagram showing a voltage nonlinear resistance layer of a vacuum valve according to embodiment 1 of the present disclosure.
Figure 11:
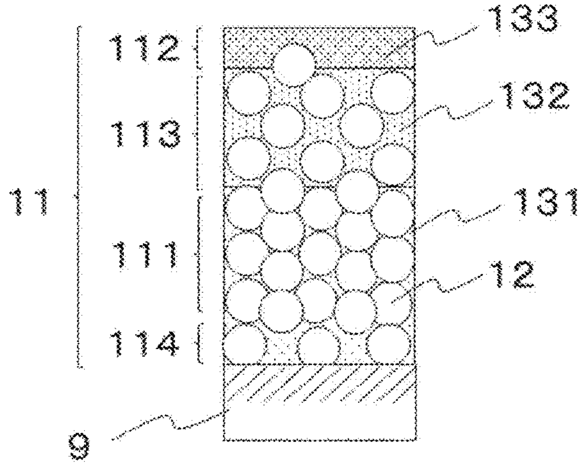
FIG. 11 is a schematic configuration diagram showing a voltage nonlinear resistance layer of a vacuum valve according to embodiment 1 of the present disclosure.
Figure 12:
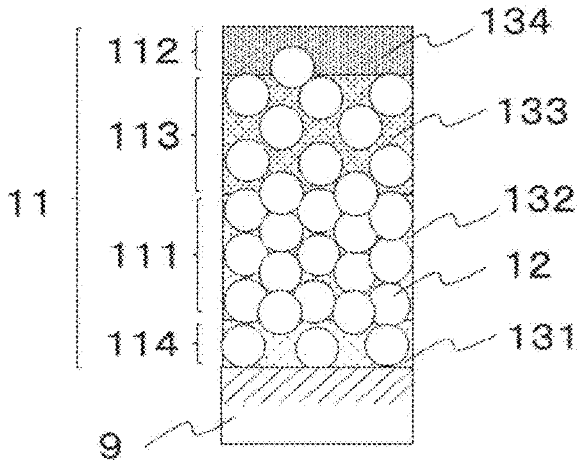
FIG. 12 is a schematic configuration diagram showing a voltage nonlinear resistance layer of a vacuum valve according to embodiment 1 of the present disclosure.

FIG. 10, FIG. 11, and FIG. 12 are each a schematic configuration diagram showing a voltage nonlinear resistance layer of a vacuum valve according to embodiment 1 of the present disclosure. In FIG. 10, as an example, two different types of a matrix material A 131 and a matrix material B 132 are used along the film thickness direction of the voltage nonlinear resistance layer 11. In FIG. 11, as an example, three different types of the matrix material A 131, the matrix material B 132, and a matrix material C 133 are used along the film thickness direction of the voltage nonlinear resistance layer 11. In FIG. 12, as an example, four different types of the matrix material A 131, the matrix material B 132, the matrix material C 133, and a matrix material D 134 are used along the film thickness direction of the voltage nonlinear resistance layer 11. As in FIG. 10, FIG. 11, and FIG. 12, as the matrix material 13 used in each portion, two or more different types of materials may be used.

Figure 13:
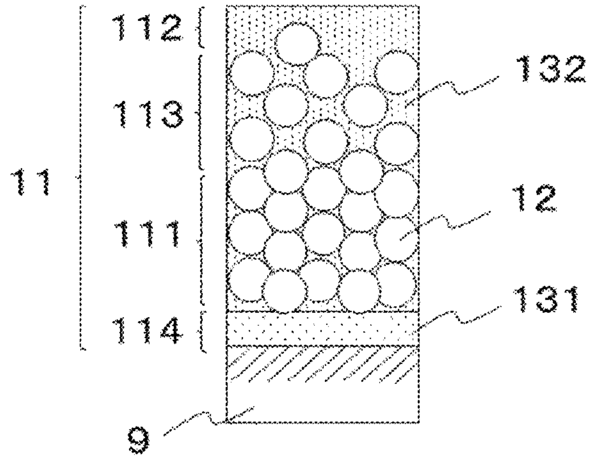
FIG. 13 is a schematic configuration diagram showing a voltage nonlinear resistance layer of a vacuum valve according to embodiment 1 of the present disclosure.

FIG. 13 is a schematic configuration diagram showing a voltage nonlinear resistance layer of a vacuum valve according to embodiment 1 of the present disclosure. As shown in FIG. 13, a layer that does not include the voltage nonlinear resistance particles 12 may be present at the insulation cylinder 9 surface.

As described above, the vacuum valve 1 according to the present disclosure is the vacuum valve 1 having: a container in which the fixed-side end plate 7 and the movable-side end plate 8 are fixed to both ends of the insulation cylinder 9; and the arc shield 10 at an intermediate portion of the insulation cylinder 9, and has the voltage nonlinear resistance layer 11 containing particles having a voltage nonlinear resistance characteristic, at at least either one of the outer creepage surface or the inner creepage surface of the insulation cylinder 9. The filling rate of the particles in the voltage nonlinear resistance layer 11 has a distribution along the film thickness direction, and the filling rate of the particles in the outermost layer is not greater than half of the average filling rate of the particles in the entirety of the voltage nonlinear resistance layer 11.

With this configuration, falling-off of the voltage nonlinear resistance particles 12 can be suppressed. Thus, it is possible to apply a structure for relaxing the electric field of the vacuum valve 1 in a state of high reliability, without impairing reliability of an apparatus. Further, since the electric field can be relaxed, the vacuum valve 1 that is downsized when compared with a conventional one can be obtained.

Next, the material of the voltage nonlinear resistance layer 11 and a method for forming the voltage nonlinear resistance layer 11 by using the same will be described.

The voltage nonlinear resistance particles 12 are a varistor containing not less than 80 wt % of zinc oxide or silicon carbide. From the viewpoint of excellence in the voltage nonlinear resistance characteristic, a material having zinc oxide as a main component is desirable. The material having zinc oxide as a main component is zinc oxide varistor particles obtained by adding, as an additive, bismuth oxide, antimony oxide, chromium oxide, nickel oxide, manganese oxide, cobalt oxide, silicon oxide, etc., to zinc oxide. The resistance characteristic thereof can be changed by the composition of the additive or the burning temperature, and the zinc oxide varistor particles can be manufactured by a method as below. Raw materials of predetermined amounts are weighed and these are pulverized/mixed with water used as a medium. At this time, it is preferable that the pulverization/mixing is performed such that the raw materials uniformly have the same average particle diameters. Then, the mixed material is sprayed into an atmosphere of a high temperature of not less than 100° C., whereby the raw materials are spray-dried. Accordingly, sphere-shaped granules in which raw materials such as zinc oxide, bismuth oxide, antimony oxide, chromium oxide, nickel oxide, manganese oxide, cobalt oxide, silicon oxide, etc. are uniformly aggregated can be obtained. Then, the granules are put into a sagger, and burned at a temperature of 1200° C. The burned granules are aggregated, and thus, are crushed to obtain the voltage nonlinear resistance particles 12.

Each voltage nonlinear resistance particle 12 has a spherical shape, but the spherical shape is formed as a gathering of primary particles of zinc oxide. Thus, projections and recesses according to the size of the primary particles are observed at the surface. The larger the size of each primary particle is, the larger the projections and recesses at the surface are, and the smaller the size of each primary particle is, the smaller the projections and recesses at the surface are. Smaller projections and recesses at the surface of each voltage nonlinear resistance particle 12 increase the contact area between particles, and thus are desirable. However, larger projections and recesses at the surface increase the contact area with the matrix material 13, thereby increasing the adhesive force. Therefore, as for the size of the projections and recesses at the surface, both of the contact area between particles and the adhesive force need to be taken into consideration.

Meanwhile, from the viewpoint of the voltage nonlinear resistance characteristic, the voltage nonlinear resistance particles 12 need not be spherical particles, but from the viewpoint of being able to increase the mixing ratio with the matrix material 13, spherical aggregates are preferable in particular.

The average particle diameter of the primary particles forming each voltage nonlinear resistance particle 12 is desirably not less than 1 μm and less than 20 μm from the viewpoint of the contact area between particles, the adhesive force with resin, and the magnitude of the threshold electric field for realizing the voltage nonlinear resistance characteristic.

Resin or glass is used as the matrix material 13, and polycarbonate, polypropylene, polyvinyl alcohol, acryl, epoxy, phenol, polyvinyl chloride, polystyrene, unsaturated polyester, polyimide, or acrylonitrile-butadiene-styrene copolymer is used as the resin. A plurality of these resins may be combined. As the matrix material 13, those suitable for a heat resistant temperature and manufacturing steps can be selected. When the voltage nonlinear resistance layer 11 is provided at the outer creepage surface of the insulation cylinder 9, epoxy resin is preferably used, and when the voltage nonlinear resistance layer 11 is provided at the inner creepage surface, glass is preferably used.

Figure 14A:
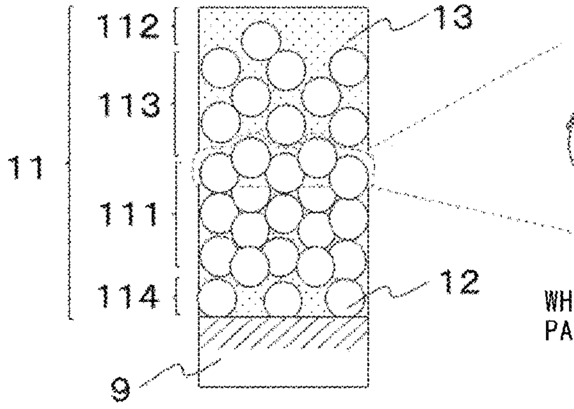
FIG. 14A is a schematic configuration diagram showing a voltage nonlinear resistance layer of a vacuum valve according to embodiment 1 of the present disclosure.
Figure 14B:
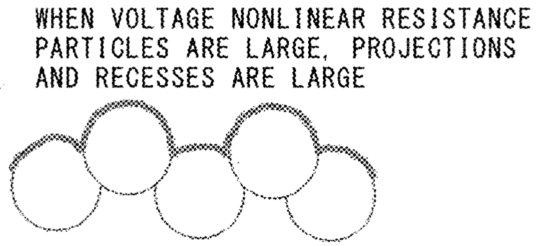
FIG. 14B is a schematic configuration diagram showing a detailed view of FIG. 14A for large voltage nonlinear resistance particles.
Figure 14C:
FIG. 14C is a schematic configuration diagram showing a detailed view of FIG. 14A for small voltage nonlinear resistance particles.

FIG. 14A is a schematic configuration diagram showing a voltage nonlinear resistance layer of a vacuum valve according to embodiment 1 of the present disclosure. When the voltage nonlinear resistance particles 12 and the matrix material 13 are mixed to make an electric field relaxation layer, a plurality of voltage nonlinear resistance particles 12 are disposed inside the matrix material 13, and projections and recesses as shown in FIGS. 14A, 14B, and 14C are caused at the interface between the voltage nonlinear resistance particles 12 and the matrix material 13. The larger the average particle diameter of the voltage nonlinear resistance particles 12 is, the larger the size of the projections and recesses becomes. The larger the projections and recesses of particles are, the larger the adhesive force due to an anchor effect becomes, when portions having different distributions in the electric field relaxation layer are in contact with each other.

As a method for making the voltage nonlinear resistance layer, various methods such as a liquid process, a semi-cure process, or a liquid-curing composite process can be adopted. The liquid process is a method in which the voltage nonlinear resistance particles 12 and the matrix material 13 are mixed, and the mixture before being cured is applied by spraying or brushing, for example, and then is cured at a predetermined temperature and duration, thereby making the voltage nonlinear resistance layer. When the voltage nonlinear resistance particles 12 and the matrix material 13 are mixed, a plurality of materials having different filling rates are produced, and these are sequentially applied, whereby a voltage nonlinear resistance layer having a distribution can be made.

Even in a case where the material having different filling rates is of one type, when the material is applied in a rotating manner, a distribution can be made. At this time, the rotation condition and the viscosity of the matrix material need to be determined in consideration of the weight of the particles, a centrifugal force caused by the rotation, and a drag received by the particles 12 having the voltage nonlinear resistance characteristic from the matrix material 13.

In the method for providing the voltage nonlinear resistance layer 11, instead of the material before being cured, the material after being cured or after being semi-cured can also be used. The semi-cure process, which uses a semi-cured material, is a method in which, for each of the portion 111 having the voltage nonlinear resistance characteristic, the particle-falling-off suppression portion 112, the stress relaxation portion A 113, and the stress relaxation portion B 114, a semi-cured material having the compositions of the voltage nonlinear resistance particles 12 and the matrix material 13 is made, and these are sequentially wound around the insulation cylinder, and then cured under pressure. With such a method as well, a similar structure can be made.

In the case of the liquid-curing composite process, which uses a cured member, a cured particle-falling-off suppression portion 112 is produced, first. Then, a material having the composition of the portion 111 having the voltage nonlinear resistance characteristic in a liquid state before being cured is caused to flow into a gap between the insulation cylinder and the cured particle-falling-off suppression portion 112, and then cured, whereby the voltage nonlinear resistance layer 11 can be made.

These methods are representative examples and make it possible to make the voltage nonlinear resistance layer 11, with a cured material and a semi-cured material combined as appropriate.

Figure 15:
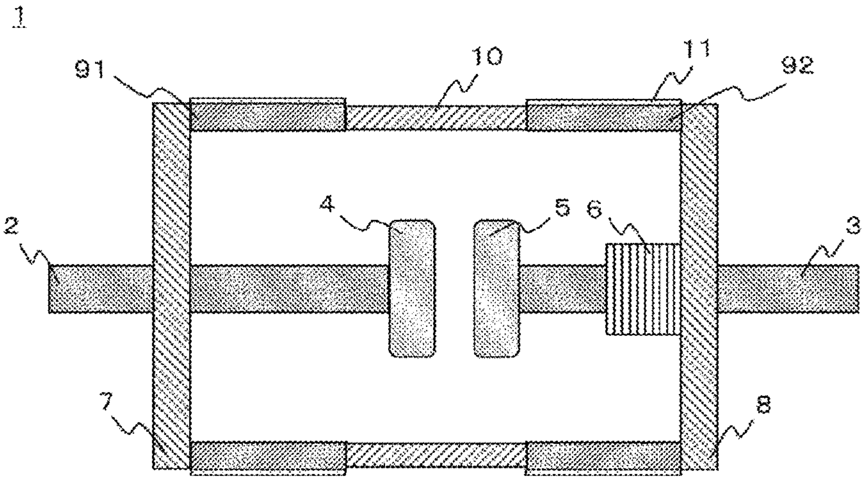
FIG. 15 is a schematic configuration diagram showing a state where contacts of a vacuum valve according to embodiment 1 of the present disclosure are open.

FIG. 15 is a schematic configuration diagram showing a state where contacts of a vacuum valve according to embodiment 1 of the present disclosure are open. When the contacts are open, high voltage is instantaneously blocked, whereby vibration is caused and the electric field in the vicinity of the contacts becomes high. Therefore, the electric field relaxation structure according to the present disclosure particularly exhibits effects immediately after the contacts are opened from the state where the contacts are closed.

Next, a structure of the voltage nonlinear resistance layer 11 will be described with reference to Examples. The formation position of the voltage nonlinear resistance layer 11, the configuration and material composition of the voltage nonlinear resistance layer 11, the filling rate in the portion having the voltage nonlinear resistance characteristic, the filling rate in the particle-falling-off suppression portion, and the manufacturing process were changed to produce the voltage nonlinear resistance layer 11, and the electric field relaxation effect, the particle-falling-off suppression effect, and voids in the film were examined.

Tables 1-1 to 1-5 show the results.

TABLE 1-1

| | Formation position of voltage nonlinear resistance layer 11 | Configuration and material composition of voltage nonlinear resistance layer 11 ("first" denotes the insulation cylinder side) First | Second | Third | Fourth | Filing rate in portion having voltage non-linear resistance characteristic (vol %) | Filing rate in particle-falling-off suppression portion (vol %) | Manufacturing process | Electric field relaxation effect | Falling off of particles | Void in film |
|---|---|---|---|---|---|---|---|---|---|---|---|
| Example 1 | insulation cylinder outer surface | stress relaxation (zinc oxide/resin) | having voltage nonlinear resistance characteristic (zinc oxide/resin) | stress relaxation (zinc oxide/resin) | particle-falling-off suppression (zinc oxide/resin) | 50 | 5 (not greater than half of average particle filling rate) | liquid process | present | absent | absent |
| Example 2 | insulation cylinder outer surface | having voltage nonlinear resistance characteristic (zinc oxide/resin) | stress relaxation (zinc oxide/resin) | particle-falling-off prevention (zinc oxide/resin) | — | 50 | 5 (not greater than half of average particle filling rate) | liquid process | present | absent | absent |
| Example 3 | insulation cylinder outer surface | stress relaxation (zinc oxide/glass) | having voltage nonlinear resistance characteristic (zinc oxide/glass) | stress relaxation (zinc oxide/glass) | particle-falling-off suppression (zinc oxide/glass) | 50 | 5 (not greater than half of average particle filling rate) | liquid process | present | absent | absent |
| Example 4 | insulation cylinder outer surface | stress relaxation zinc oxide/glass) | having voltage nonlinear resistance characteristic (zinc oxide/resin) | stress relaxation (zinc oxide/resin) | particle-falling-off suppression (zinc oxide/glass) | 50 | 5 (not greater than half of average particle filling rate) | liquid process | present | absent | absent |

TABLE 1-2

| | Formation position of voltage nonlinear resistance layer 11 | Configuration and material composition of voltage nonlinear resistance layer 11 ("first" denotes the insulation cylinder side) First | Second | Third | Fourth | Filing rate in portion having voltage non-linear resistance characteristic (vol %) | Filing rate in particle-falling-off suppression portion (vol %) | Manufacturing process | Electric field relaxation effect | Falling-off of particles | Void in film |
|---|---|---|---|---|---|---|---|---|---|---|---|
| Example 5 | insulation cylinder outer surface | having voltage nonlinear resistance characteristic (zinc oxide/resin) | having voltage nonlinear resistance characteristic (zinc oxide/glass) | stress relaxation (zinc oxide/glass) | particle-falling-off suppression (zinc oxide/resin) | 50 | 5 (not greater than half of average particle filling rate) | liquid process | present | absent | absent |
| Example 6 | insulation cylinder outer surface | stress relaxation (silicon carbide/resin) | having voltage nonlinear resistance characteristic (silicon carbide/resin) | stress relaxation (silicon carbide/resin) | particle-falling-off suppression (silicon carbide/resin) | 50 | 5 (not greater than half of average particle filling rate) | liquid process | present | absent | absent |
| Example 7 | insulation cylinder outer surface | having voltage nonlinear resistance characteristic (zinc oxide/resin) | having voltage nonlinear resistance characteristic (zinc oxide/glass) | stress relaxation (zinc oxide/glass) | particle-falling-off suppression (resin) | 50 | 0 (not greater than half of average particle filling rate) | liquid process | present | absent | absent |

TABLE 1-2-continued

| | Formation position of voltage nonlinear resistance layer 11 | Configuration and material composition of voltage nonlinear resistance layer 11 ("first" denotes the insulation cylinder side) First | Second | Third | Fourth | Filing rate in portion having voltage non-linear resistance characteristic (vol %) | Filing rate in particle-falling-off suppression portion (vol %) | Manufacturing process | Electric field relaxation effect | Falling-off of particles | Void in film |
|---|---|---|---|---|---|---|---|---|---|---|---|
| Example 8 | insulation cylinder inner surface | stress relaxation (zinc oxide/glass) | having voltage nonlinear resistance characteristic (zinc oxide/glass) | stress relaxation (zinc oxide/glass) | particle-falling-off suppression (zinc oxide/glass) | 50 | 5 (not greater than half of average particle filling rate) | liquid process | present | absent | absent |

TABLE 1-3

| | Formation position of voltage nonlinear resistance layer 11 | Configuration and material composition of voltage nonlinear resistance layer 11 ("first" denotes the insulation cylinder side) First | Second | Third | Fourth | Filing rate in portion having voltage non-linear resistance characteristic (vol %) | Filing rate in particle-falling-off suppression (vol %) | Manufacturing process | Electric filed relaxation effect | Falling-off of particles | Void in film |
|---|---|---|---|---|---|---|---|---|---|---|---|
| Example 9 | insulation cylinder outer surface | stress relaxation zinc oxide/resin) | having voltage nonlinear resistance characteristic (zinc oxide/resin) | stress relaxation (zinc oxide/resin) | particle-falling-off suppression (zinc oxide/resin) | 50 | 5 (not greater than half of average particle filling rate) | semi-cure process | present | absent | absent |
| Example 10 | insulation cylinder outer surface | stress relaxation (zinc oxide/resin) | having voltage nonlinear resistance characteristic (zinc oxide/resin) | stress relaxation (zinc oxide/resin) | particle-falling-off suppression (zinc oxide/resin) | 50 | 5 (not greater than half of average particle filling rate) | liquid-curing process | present | absent | absent |
| Example 11 | insulation cylinder outer surface | stress relaxation (zinc oxide/resin) | having voltage nonlinear resistance characteristic (zinc oxide/resin) | stress relaxation (zinc oxide/resin) | particle-falling-off suppression (zinc oxide/resin) | 74 | 5 (not greater than half of average particle filling rate) | liquid process | present | absent | absent |
| Example 12 | insulation cylinder outer surface | stress relaxation (zinc oxide/resin) | having voltage nonlinear resistance characteristic (zinc oxide/resin) | stress relaxation (zinc oxide/resin) | particle-falling-off suppression (zinc oxide/resin) | 75 | 5 (not greater than half of average particle filling rate) | liquid | present | absent | present |

TABLE 1-4

| | Formation position of voltage nonlinear resistance layer | Configuration and material composition of voltage nonlinear resistance layer 11 ("first" denotes the insulation cylinder side) | | | | Filing rate in portion having voltage non-linear resist-ance charac-teristic | Filing rate in particle-falling-off suppression portion | Manu-facturing | Electric filed relaxation | Falling-off of | Void in |
|---|---|---|---|---|---|---|---|---|---|---|---|
| | 11 | First | Second | Third | Fourth | (vol %) | (vol %) | process | effect | particles | film |
| Example 13 | insulation cylinder outer surface | stress relaxation (zinc oxide/resin) | having voltage nonlinear resistance characteristic (zinc oxide/resin) | stress relaxation (zinc oxide/ resin) | particle-falling-off suppression (zinc oxide/resin) | 25 | 5 (not greater than half of average particle filling rate) | liquid process | present | absent | absent |
| Example 14 | insulation cylinder outer surface | stress relaxation (zinc oxide/resin) | having voltage nonlinear resistance characteristic but with decreased performance (zinc oxide/resin) | stress relaxation (zinc oxide/ resin) | particle-falling-off suppression (zinc oxide/resin) | 24 | 5 (not greater than half of average particle filling rate) | liquid process | present (decrease of effect was observed) | absent | absent |
| Example 15 | insulation cylinder outer surface | stress relaxation (zinc oxide/resin) | having voltage nonlinear resistance characteristic (zinc oxide/resin) | stress relaxation (zinc oxide/ resin) | particle-falling-off suppression (zinc oxide/resin) | 50 | 10 (not greater than half of average particle filling rate) | liquid process | present | absent | absent |
| Example 16 | insulation cylinder outer surface | stress relaxation (zinc oxide/resin) | having voltage nonlinear resistance characteristic (zinc oxide/resin) | stress relaxation (zinc oxide/ resin) | particle-falling-off suppression (zinc oxide/resin) | 50 | 11 (not greater than half of average particle filling rate) | liquid process | present | suppress | absent |

TABLE 1-5

| | Formation position of voltage nonlinear resistance layer | Configuration and material composition of voltage nonlinear resistance layer 11 ("first" denotes the insulation cylinder side) | | | | Filing rate in portion having voltage non-linear resist-ance charac-teristic | Filing rate in particle-falling-off suppression portion | Manu-facturing | Electric filed relaxation | Falling-off of | Void in |
|---|---|---|---|---|---|---|---|---|---|---|---|
| | 11 | First | Second | Third | Fourth | (vol %) | (vol %) | process | effect | particles | film |
| Example 17 | insulation cylinder outer surface | stress relaxation (zinc oxide/resin) | having voltage nonlinear resistance characteristic (zinc oxide/ resin) | stress relaxation zinc oxide/resin) | particle-falling-off suppression (zinc oxide/resin) | 50 | 5 (not greater than half of average particle filling rate) | liquid process | present | absent | absent |
| | insulation cylinder inner surface | stress relaxation (zinc oxide/glass) | having voltage nonlinear resistance characteristic (zinc oxide/ glass) | stress relaxation (zinc oxide/glass) | particle-falling-off suppression (zinc oxide/glass) | 50 | 5 (not greater than half of average particle filling rate) | liquid process | | | |
| Com-parative example 1 | insulation cylinder outer surface | stress relaxation (zinc oxide/resin) | having voltage nonlinear resistance characteristic (zinc oxide/ resin) | stress relaxation (zinc oxide/resin) | particle-falling-off suppression (zinc oxide/resin) | 50 | Greater than average particle filling rate | liquid process | present | present | absent |

In Tables 1-1 to 1-5, "filling rate in portion having voltage nonlinear resistance characteristic" indicates the filling rate in the portion 111 having the voltage nonlinear resistance characteristic. "Filling rate in particle-falling-off suppression portion" indicates the filling rate in the particle-falling-off suppression portion 112 corresponding to the outermost layer. Examples 1, 2, 3, 4, 5, 6 were obtained by changing the configurations such as the number of layers or the materials forming the layers with respect to the insulation cylinder outer surface. Even when the number of layers and the materials forming the layers were changed as in Examples, the electric field relaxation effect was present and the performance of particle-falling-off suppression was compatible therewith.

As in Example 7, even when the particle-falling-off suppression portion did not contain voltage nonlinear resistance particles and only the matrix material was used, the same effect was obtained. Example 8 was formed at the insulation cylinder inner surface, with the same layer configuration as that of Example 3, and the electric field relaxation effect was also present at the inner surface, and the performance of preventing falling-off of particles was compatible therewith. Examples 9, 10 were obtained by changing the manufacturing process, with the same layer configuration and material composition as those of Example 1. Even when the manufacturing process was changed, the electric field relaxation effect was present, and the performance of preventing falling-off of particles was compatible therewith.

Examples 11, 12, 13, 14 were obtained by changing the filling rate in the portion having the voltage nonlinear resistance characteristic. The filling rate was 74 vol % in Example 11, 75 vol % in Example 12, 25 vol % in Example 13, and 24 vol % in Example 14. In Examples 11 and 13, the presence of the electric field relaxation effect was confirmed, and the effect of preventing falling-off of particles was also observed. Meanwhile, in Example 12, although the electric field relaxation effect was present, voids were observed in the film. Example 14 had the electric field relaxation effect but decrease in the effect due to the small filling amount of the voltage nonlinear resistance particles was observed. Thus, it was found that the filling rate in the portion having the voltage nonlinear resistance characteristic is desirably not less than 25 vol % and not greater than 74 vol %.

Examples 15, 16 and Comparative example 1 were obtained by changing the filling rate in the particle-falling-off suppression portion. The filling rate was, in Example 15, 10 vol, which corresponds to not greater than half of the average particle filling rate, was, in Example 16, 11 vol % which corresponds to not greater than half of the average particle filling rate, and was, in Comparative example 1, greater than half of the average particle filling rate. In Example 15, falling-off of particles was not observed, and the electric field relaxation effect was also observed. In Example 16, an effect of suppressing falling-off of particles was observed. Meanwhile, it was found that falling-off of particles was observed at the filling rate of Comparative example 1. Thus, it was found that the filling rate in the particle-falling-off suppression portion needs to be not greater than half of the average particle filling rate, and desirably not greater than 10 vol %.

In Example 17, Example 1 and Example 8 were combined and the formation position of the voltage nonlinear resistance layer 11 was set to both of the insulation cylinder outer surface and the insulation cylinder inner surface. Similar to the cases where the voltage nonlinear resistance layer 11 was formed only at the insulation cylinder outer surface or only at the insulation cylinder inner surface, the electric field relaxation effect was present and the performance of particle-falling-off suppression was compatible therewith.

DESCRIPTION OF THE REFERENCE CHARACTERS

1 vacuum valve
2 fixed-side electrode rod
3 movable-side electrode rod
4 fixed-side contact
5 movable-side contact
6 bellows
7 fixed-side end plate
8 movable-side end plate
9 insulation cylinder
10 arc shield
11 voltage nonlinear resistance layer
12 voltage nonlinear resistance particle
13 matrix material
91 insulation cylinder A
92 insulation cylinder B
111 portion having voltage nonlinear resistance characteristic
112 particle-falling-off suppression portion
113 stress relaxation portion A
114 stress relaxation portion B
131 matrix material A
132 matrix material B
133 matrix material C
134 matrix material D

The invention claimed is:

1. A vacuum valve including a structure having: a container in which a fixed-side end plate and a movable-side end plate are fixed to both ends of an insulation cylinder; and an arc shield at an intermediate portion of the insulation cylinder, the vacuum valve comprising:

a voltage nonlinear resistance layer containing particles having a voltage nonlinear resistance characteristic at at least either one of an outer creepage surface or an inner creepage surface of the insulation cylinder, wherein a filling rate of the particles in the voltage nonlinear resistance layer has a distribution along a film thickness direction, and a filling rate of the particles in an outermost layer is not greater than half of an average filling rate of the particles in an entirety of the voltage nonlinear resistance layer.

2. The vacuum valve according to claim 1, wherein in the voltage nonlinear resistance layer, the filling rate of the particles in the outermost layer is not greater than 10 vol %.

3. The vacuum valve according to claim 1, wherein the filling rate of the particles in the voltage nonlinear resistance layer has a distribution of not less than 25 vol % and not greater than 74 vol %.

4. The vacuum valve according to claim 1, wherein the filling rate of the particles in the voltage nonlinear resistance layer is high at a surface of the insulation cylinder and becomes lower further away from the surface of the insulation cylinder.

5. The vacuum valve according to claim 1, wherein between the outermost layer and a portion having voltage nonlinear resistance characteristics having a filling rate of the particles of not less than 25 vol % and not greater than 74 vol %, a distribution portion having a filling rate of the particles between the filling rate in the outermost layer and the filling rate of not less than 25 vol % and not greater than 74 vol % is included.

6. The vacuum valve according to claim 1, wherein the particles having the voltage nonlinear resistance characteristic are a main component containing not less than 80 wt % of zinc oxide or silicon carbide.

7. The vacuum valve according to claim 1, wherein the particles having the voltage nonlinear resistance characteristic are each an aggregate of two or more primary particles.

8. The vacuum valve according to claim 1, wherein an average particle diameter of primary particles forming each of the particles having the voltage nonlinear resistance characteristic is not less than 1 μm and less than 20 μm.

9. The vacuum valve according to claim 1, wherein the voltage nonlinear resistance layer is provided so as to electrically connect the fixed-side end plate and the movable-side end plate, and is provided at a portion of the insulation cylinder.

10. The vacuum valve according to claim 1, wherein the voltage nonlinear resistance layer is provided between either one of the fixed-side end plate and the movable-side end plate, and the arc shield, and is provided at an entire surface or a portion of the insulation cylinder.

11. The vacuum valve according to claim 1, wherein two or more types of matrix materials forming the voltage nonlinear resistance layer are used.

12. A method for manufacturing a vacuum valve including a structure having: a container in which a fixed-side end plate and a movable-side end plate are fixed to both ends of an insulation cylinder; and an arc shield at an intermediate portion of the insulation cylinder, the method comprising:

applying a material, in a liquid state, containing particles having a voltage nonlinear resistance characteristic at at least either one of an outer creepage surface or an inner creepage surface of the insulation cylinder, and curing the material, to form a voltage nonlinear resistance layer, such that a filling rate of the particles in the voltage nonlinear resistance layer has a distribution along a film thickness direction, and a filling rate of the particles in an outermost layer is not greater than half of an average filling rate of the particles in an entirety of the voltage nonlinear resistance layer.

13. The method for manufacturing the vacuum valve according to claim 12, wherein the voltage nonlinear resistance layer is obtained through adhesion or pressure-bonding of a part in a cured material or a semi-cured state.

14. The method for manufacturing the vacuum valve according to claim 12, wherein the voltage nonlinear resistance layer is obtained by causing a liquid material to flow into a gap between a part in a cured material or a semi-cured state and the insulation cylinder and curing the liquid material.

* * * * *